Figure 1:
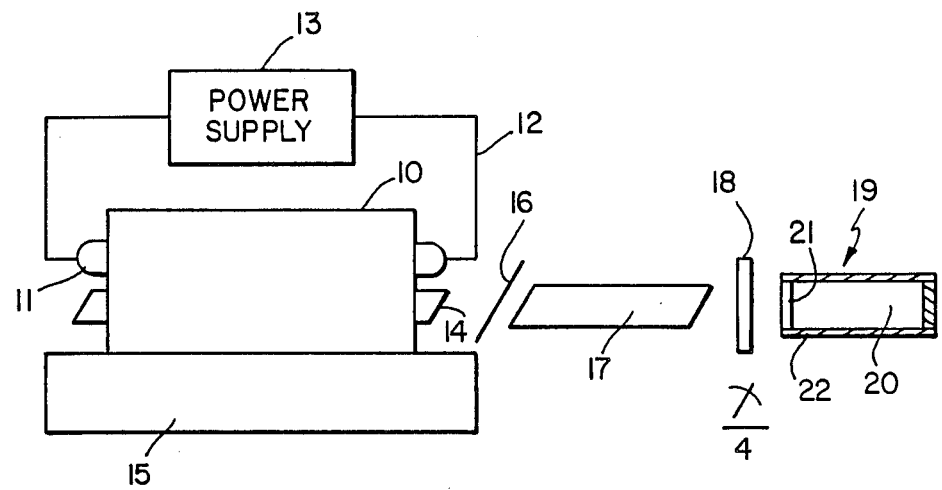

United States Patent [19]

Dube'

[11] Patent Number: 4,791,644
[45] Date of Patent: Dec. 13, 1988

[54] LASER SYSTEM INCORPORATING BROAD BAND OPTICAL PHASE CONJUGATION CELL USING STIMULATED BRILLOUIN SCATTERING

[75] Inventor: George Dube', Dalton, Pa.

[73] Assignee: General Electric Company, Binghamton, N.Y.

[21] Appl. No.: 815,325

[22] Filed: Dec. 31, 1985

[51] Int. Cl.$^4$ .............................................. H01S 3/30
[52] U.S. Cl. ........................................ 372/3; 372/97; 372/99
[58] Field of Search .................. 372/3, 19, 97, 99, 94; 330/4.3; 356/350

[56] References Cited

U.S. PATENT DOCUMENTS

| | | | |
|---|---|---|---|
| 3,617,927 | 11/1972 | Pohl | 372/99 X |
| 4,429,393 | 1/1984 | Giuliano | 372/21 |
| 4,493,085 | 1/1985 | Valley | 372/106 X |
| 4,573,157 | 2/1986 | O'Meara | 372/19 |

OTHER PUBLICATIONS

Gower et al, "KrF Laser with a Phase-Conjugate Brillouin Mirror", Optics Letter, vol. 7, No. 4, Apr. 1982, pp. 162-164.
Wang et al., "Correction . . . Scattering", Optics Letters, vol. 2, No. 1, Jan. 1978, pp. 4-6.
Alcock et al., "Multiple . . . Cavity", Applied Physics Letters, vol. 11, No. 2, Jul. 1967, pp. 42-44.
Chandra, "Sidearm Stimulated Scattering . . . Resonator", Optics Letters, vol. 10, No. 7, Jul. 1985, pp. 356-358.

Primary Examiner—Eugene R. Laroche
Assistant Examiner—Seung Ham
Attorney, Agent, or Firm—David Blumenfeld

[57] ABSTRACT

A laser system utilizing a Stimulated Brillouin Scattering SBS cell to produce optical phase conjugate retroreflection for nonmonochromatic light from a laser system.

6 Claims, 1 Drawing Sheet

LASER SYSTEM INCORPORATING BROAD BAND OPTICAL PHASE CONJUGATION CELL USING STIMULATED BRILLOUIN SCATTERING

BACKGROUND OF THE INVENTION

This invention relates to a laser system and more particularly, one utilizing Stimulated Brillouin Scattering for phase conjugation retroreflection.

The term Brillouin Scattering refers to the effect produced by certain materials, upon intense light. The impingement of such radiation on these materials cause scattering which results in the production of a doublet in which the frequency of the two lines differs from the frequency of the original line by the same amount; one line having a higher frequency and the other a lower frequency.

Stimulated Brillouin Scattering has been proposed as optical phase conjugation retroreflectors in laser systems. That is, if a Stimulated Brillouin Scattering cell containing the selected material is substituted for a mirror, the impinging laser light is reflected with a cancellation effect being noted, i.e., distortions in the light produced by a laser amplifier, or its associated optics are cancelled in the reflected light from the SBS cell. It has hitherto been found that optical phase conjugation retroreflection by Simulated Brillouin Scattering operates most effectively when the laser is operated in a single longitudinal mode.

It has been found that when the laser is operated in more than one longitudinal mode, the reflectivity of the SBS interaction is reduced and phase conjugation is correspondingly less effective. Unfortunately, attempts to restrict laser operation to single longitudinal modes limits the intensity and the shape of the laser output. That is, single longitudinal mode lasers will remain in a single mode only when pumped near their thresholds. Any attempt to increase the output power by pumping more intensely results in the introduction of additional longitudinal modes and the consequent reduction in Brillouin Scattering with the attendant reduction of the effectiveness of the retroreflector.

Applicant has found that laser systems may be operated with intense multi-longitudinal mode laser beams which will nonetheless be highly reflected in a Stimulated Brolluoin Scattering interaction thereby resulting in a highly effective optical phase conjugational retroreflector.

Applicant has found this may be achieved by the combination of narrow band width SBS materials and shortening the cavity of the laser oscillator until the longitudinal mode spacing is large compared to the Brillouin linewidth $L_0$.

In a laser with a cavity length L, a frequency separation of adjacent longitudinal modes ($\Delta \nu$) is given by:

$$\Delta V(L) = C/2L$$

$L_0$ is the laser cavity length at which the longitudinal mode spacing $(\Delta V)$ = Brillouin line width $\Gamma_\beta$
Hence, $$\Delta V(L_0) = C/2L = \Gamma_\beta; \text{ or}$$

$$L_0 = C/2\Gamma_\beta.$$

If L is less than $L_0$, $\Delta V$ will be greater than $\Gamma_\beta$ and each longitudinal mode will undergo Simulated Brillouin Scattering (SBS) independent of any interactions with other laser modes.

It is, therefore, a principal objective of the invention to devise a laser system with a Stimulated Brillouin Scattering retroreflector which is capable of operating in multiple longitudinal modes while achieving high reflectivities in the retroreflector.

Another objective of the invention is to produce a laser system having high scattering reflectivities even with multimode laser operation.

Other objectives and advantages of the invention will become apparent as the description thereof proceeds.

BRIEF DESCRIPTION OF THE INVENTION

The invention comprises a source of coherent light produced by a laser oscillator which is amplified and then passed to an optical phase conjugate retroreflector cell containing a fluid which produces Stimulated Brillouin Scattering of high reflectivity. The reflected light is passed through the amplifier again to compensate for any optical aberrations produced in the amplifier or associated optical equipment through which the light from the laser oscillator has passed. The length of the oscillator cavity L is made to be less than the length of the Brillouin line width $L_0$ i.e.

$$L \geq L_0 = C/2\Gamma_\beta$$

where C is the speed of light 1 and $\Gamma_B$ is the Brillouin linewidth of SBS material.

With this ratio, high reflectivity of multi-longitudinal mode laser beams from an SBS interaction will occur. To achieve such values of L, materials exhibiting narrow band width Brillouin Scattering, such a methane ($Ch_4$) at 130 atmospheres are utilized in the cells. When methane @ 130 atm is utilized $L_0$ is 120 cm and for a $L \geq 0.1\ L_0$, the laser cavity length L of approximately 12 centimeters (i.e. ~5 inches) will produce the desired result.

Other objectives and advantages of the instant invention will become apparent as the description thereof proceeds.

Other features believed characteristic of this invention are set forth with particularity in the appended claims. The invention itself, however, together with other objects and advantages thereof will best be understood by reference to the following description taken in conjunction with the accompanying drawings in which the sole FIGURE illustrates a laser system of the invention.

The FIG. 1 shows a block diagram of a laser system incorporating an optical phase conjugation retroflector in which Simulated Brillouin scattering is used.

The FIG. 1 shows a light source 11 in the form of a flash lamp mounted in a housing 10 which also supports the laser material 14. Lamp 11 may typically be a xenon gas filled lamp which may have its envelope doped with cerium to block ultraviolet emissions. The lamp electrodes are connected through leads 12 to a flash lamp power supply 13 which pulses the lamp intermittently. The laser is mounted on optical bed 15 which could include a mirror surface at one end not shown. The coherent light emitted from laser oscillator slab 14 is projected through a half silvered mirror 16 to a laser amplifier 17 shown schematically by means of a laser slab. The amplified laser light passes through a quarter wave ($\lambda/4$) plate 18 to an SBS cell 19 which acts as an optical phase conjugation retroflector.

SBS Cell 19 consists of a housing 22 having a glass window 21 at the front end through which the coherent light enters an interior chamber 20 containing the fluid which produces high reflectivity Stimulated Brillouin Scattering. The reflected light from cell 19 passes through quarter wave length plate 18, amplifier 17 to the partially silvered mirror 16 and out with any optical aberrations having been compensated.

As pointed out previously, the size of the optical cavity must be sufficiently short so that the longitudinal mode spacing $\Delta V$ is large compared to the Brillouin line width $\Gamma_B$ which in turn is a function of the fluid utilized in the SBS cell. The longitudinal mode spacing of the laser oscillator is given in the formula:

$$\Delta V = C/2L, \quad (1)$$

where C is the speed of light and L is the optical path length of the laser oscillator. The condition for high reflectivity of multi-longitudinal mode laser beams from SBS interaction then is defined by the equation:

$$L < L_0 = C/2\Gamma_\beta = C/2\gamma \quad (2)$$

where the $\tau$ is the phonon lifetime which is defined by the Equation:

$$\tau = 1/\Gamma_\beta$$

For high reflectivities the optical path length L of the laser oscillator must be less than a length $L_0$ which is is inversely proportional to the Brillouin line width; preferably substantially less than $L_0$, i.e., $L \leq 0.1\ L_0$ thus requiring very short cavities. However, short cavities are feasible if narrow bandwidth SBS fluid materials are used. Reported values for various SBS materials are shown in the tabulation below.

| MATERIAL | $\Gamma$ B (MH$_3$ | $\tau$(NS) | $L_o$ (CM) |
|---|---|---|---|
| C Cl$_4$ | 650 | | 23 |
| CH$_4$ (@ 10 Atm) | | .1 | 1.5 |
| CH$_4$ (@ 130 Atm) | | 8 | 120 |
| CS$_2$ | 75 | | 200 |

It can be seen from the above tabulation that SBS cells utilizing methane (CH$_4$) at 130 atmospheres result in a value of $L_0$ of 120 centimeters. A laser cavity shorter than this size is readily achievable and will produce the desired high reflectivity SBS interaction. Thus, the combination of a laser cavity of approximately 50 cm with a narrow bandwidth SBS material such as methane at 130 atmospheres will produce high reflectivity even with multi-longitudinal mode laser beams.

It will also be noted from the above tabulation that other materials such as the liquid carbon disulfide could be used to produce the same results with the cavity optical path length for the laser being less than 200 centimeters.

It will be apparent from the previous discussion that a highly useful and effective laser system is made available in which Simulated Brillouin Scattering of high reflectivity may be produced with laser oscillators operating in multi-longitudinal modes by the combination of narrow bandwidths Brillouin Scattering Materials and short laser optical cavities.

While a particular embodiment of this invention has been shown, it will, of course, be understood that the invention is not limited thereto since many modifications both in the structural arrangement and in the instrumentalities employed may be made. It is contemplated by the appended claims to cover any such modifications that lie within the true spirit and scope of this invention.

What is claimed as new and desired to be secured by Letters Patent of the United States is:

1. In a laser system with stimulated Brillouin interaction, the combination comprising,
   (a) laser means including a lasing medium, a light source for pumping said lasing medium, said lasing medium positioned in a resonant cavity of Length L a retroflector means included as one of the cavity mirrors, energy extracting means for bringing coherent, light out of said cavity in multiple longitudinal modes;
   (b) optical phase conjugation retroflector means to intercept light from the cavity of said laser means including a Stimulated Brillouin Scattering Cell a fluid for producing the Stimulated Brillouin Scattering interaction and for reflecting the impinging light; the pressure of said Brillouin scattering fluid in said cell being such that the Brillouin line width induced in said cell is less than the frequency separation of adjacent longitudinal laser mode spacings from said laser cavity of length L;
   (c) said laser output longitudinal mode spacings for a cavity length L being large compared to the Brillouin line widths produced by scattering interactions whereby high scattering reflectivities are achieved even with multiple longitudinal wave laser outputs.

2. The laser according to claim 1 wherein the laser path length L is +0.1 of the path length $L_0$ that produces a mode spacing just greater than the line width.

3. The laser system according to claim 1 wherein said cell contains a gaseous Brillouin Scattering fluid under pressure.

4. The laser system according to claim 3 wherein said gaseous fluid is methane.

5. The laser system according to claim 4 wherein said methane is maintained at a pressure of 130 atmospheres.

6. The laser system according to claim 1 where said cell contains liquid carbon disulfide as the scattering material.

* * * * *